(12) United States Patent
Menzel et al.

(10) Patent No.: US 9,264,112 B2
(45) Date of Patent: Feb. 16, 2016

(54) METHOD FOR OPERATING A COMMUNICATIONS SYSTEM IN WIRELESS VEHICLE-TO-ENVIRONMENT COMMUNICATION, AND COMMUNICATION SYSTEM

(71) Applicants: Marc Menzel, Weimar (DE); Ulrich Stählin, Eschborn (DE)

(72) Inventors: Marc Menzel, Weimar (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/353,997

(22) PCT Filed: Oct. 22, 2012

(86) PCT No.: PCT/EP2012/070851
§ 371 (c)(1),
(2) Date: Apr. 24, 2014

(87) PCT Pub. No.: WO2013/060639
PCT Pub. Date: May 2, 2013

(65) Prior Publication Data
US 2014/0274182 A1 Sep. 18, 2014

(30) Foreign Application Priority Data
Oct. 25, 2011 (DE) .......................... 10 2011 085 185

(51) Int. Cl.
*H04W 72/00* (2009.01)
*H04B 7/04* (2006.01)
*H04B 7/08* (2006.01)

(52) U.S. Cl.
CPC ................ *H04B 7/04* (2013.01); *H04B 7/0871* (2013.01); *H04B 7/0877* (2013.01)

(58) Field of Classification Search
CPC ....... H04W 4/046; H04W 4/06; H04W 84/18; H04W 4/04
USPC ......................................... 455/452.2; 370/329
See application file for complete search history.

(56) References Cited

U.S. PATENT DOCUMENTS

| | | |
|---|---|---|
| 6,678,508 B1 | 1/2004 | Koilpillai et al. |
| 6,792,258 B1 | 9/2004 | Nokes et al. |
| 2004/0155825 A1 | 8/2004 | Komatsu et al. |
| 2006/0149475 A1* | 7/2006 | Kellum et al. ................ 701/300 |
| 2009/0097599 A1 | 4/2009 | Abdelgany et al. |
| 2010/0173600 A1 | 7/2010 | Izumi et al. |
| 2010/0225414 A1 | 9/2010 | Gorbachov |
| 2011/0306353 A1* | 12/2011 | Kim et al. .................. 455/452.2 |
| 2012/0093091 A1* | 4/2012 | Kang et al. .................... 370/329 |

FOREIGN PATENT DOCUMENTS

| | | |
|---|---|---|
| DE | 600 28 444 T2 | 12/2006 |
| EP | 1 564 909 A2 | 8/2008 |

* cited by examiner

*Primary Examiner* — Tu X Nguyen
(74) *Attorney, Agent, or Firm* — Cozen O'Connor

(57) ABSTRACT

A method for operating a communication system in wireless vehicle-to-environment communication includes: transmitting, using the communication system, different information as signals on various radio channels in accordance with its content, the communication system having at least two reception paths each having at least one separate antenna and an associated separate receiver for receiving the transmitted signals; and changing over the communication system between two modes of operation when a changeover criterion is satisfied, such that the at least two reception paths receive signals on a different radio channel in a first mode of operation and receive signals on the same radio channel in a second mode of operation.

12 Claims, 2 Drawing Sheets

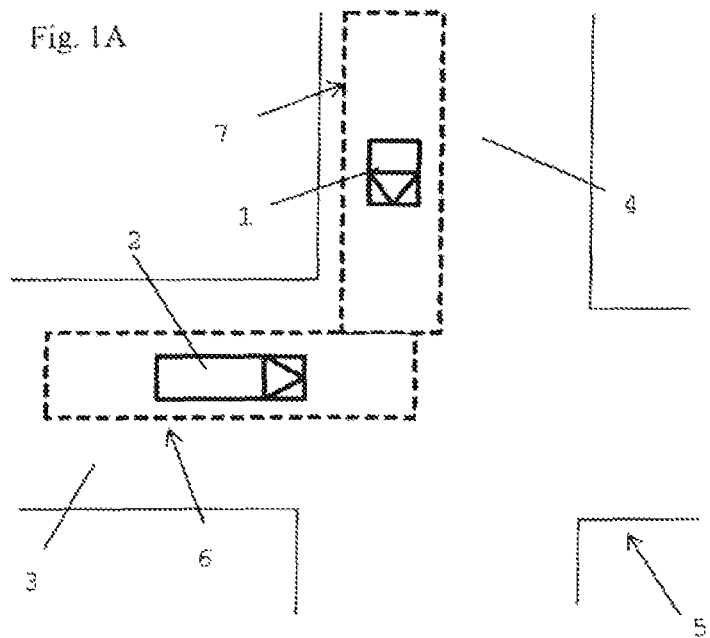
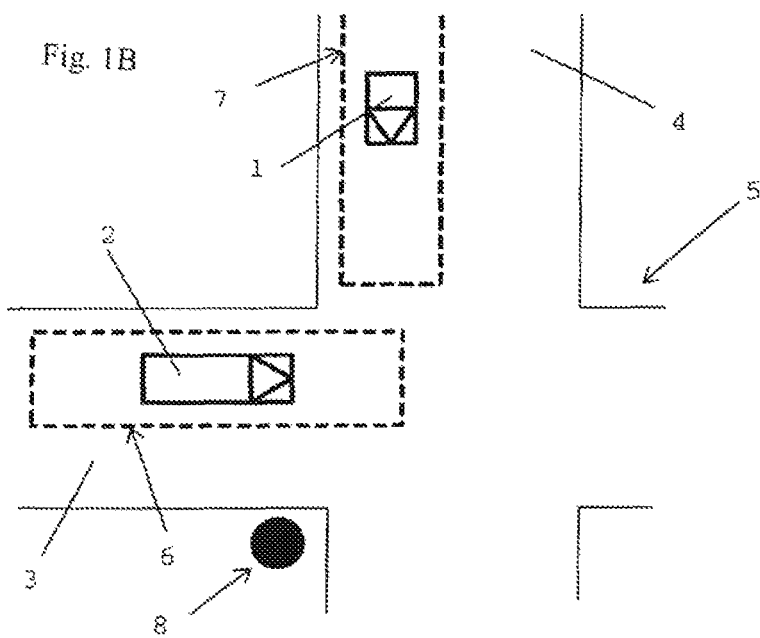

METHOD FOR OPERATING A COMMUNICATIONS SYSTEM IN WIRELESS VEHICLE-TO-ENVIRONMENT COMMUNICATION, AND COMMUNICATION SYSTEM

CROSS-REFERENCE TO RELATED APPLICATIONS

This is a U.S. national stage of application No. PCT/EP2012/070851, filed on 22 Oct. 2012, which claims priority to the German Application No. 10 2011 085 185.2, filed 25 Oct. 2011, the content of both incorporated herein by reference.

BACKGROUND OF THE INVENTION

The invention relates to a method for operating a communication system, preferably in a motor vehicle, in wireless vehicle-to-environment communication (C2X communication), which can take place as vehicle-to-infrastructure communication (C2I) or vehicle-to-vehicle communication (C2C).

SUMMARY OF THE INVENTION

This type of communication involves different information being transmitted as signals on various radio channels in accordance with its content. In this regard, Europe and the USA use, in particular, wireless communication in the IEEE 802.11p specification in accordance with a standard for the communication of intelligent transport systems (ITS). In Europe, the communication takes place in a frequency range from 5.850 to 5.925 GHz, in which a control channel (CCH) and at least two service channels (SCH) are implemented. The control channel is used for broadcast communication, in which a piece of information is intended to be transmitted to a plurality of or all participants in the communication network. This channel is reserved for short, safety-critical information with only low latencies and for communication management. The service channels are used for transmitting additional, non-safety-critical data, for example for application-specific information, road geometry, etc.

The communication system used according to the invention for this communication has a plurality of, at least two, reception paths that each have at least one separate antenna and an associated separate receiver for receiving the transmitted signals. One reception path is usually reserved for the control channel. Further reception paths are used for receiving (and sending) on one or possibly even a plurality of service channel(s). In this case, a reception path can preferably send or receive on precisely one radio channel at a particular time. The effect achieved by the fixed allocation of a reception channel to the control channel is that the important control channel is always ready for communication. The invention likewise relates to an appropriately set-up communication system.

The C2X communication involves data being interchanged between the vehicle and objects in its environment. The objects in the environment of the vehicle may be other vehicles involved in the traffic or at rest (on board units—OBU), permanently installed transmission units at the edge of the road (road side units—RSU) or else pedestrians equipped with appropriate transmitters and/or receivers. The interchanged data perform various functions, for example a protective, warning and/or information function, and can accordingly also be used by driver assistance systems.

As already mentioned, the data are interchanged on various radio channels on the basis of their function. The explicit type and nature of the information and the demands on the transmitter and the receiver are stipulated by an industrial standard in this case and are not the subject matter of this invention.

A general problem in mobile communication is caused by the constant alteration of position of at least a large portion of the communication partners. This problem is particularly pronounced in the case of mobile appliances that are moving at rapid speed (relative to one another), such as the OBUs mounted in motor vehicles. The motion constantly alters the environment of the mobile appliance. As a consequence thereof, the propagation paths for the transmitted information are also subject to constant change. The nature of the environment means that reflections can result in multipath propagation of the transmitted information. This is particularly pronounced in urban traffic, for example, in which the electromagnetic radio waves are reflected on house façades.

In certain spatial configurations, interference phenomena may arise. In this case, the electromagnetic wave with the information impressed thereon is to some extent or completely canceled by destructive interference. This results in noise in the transmission of information and can significantly impair the quality of the transmission. In extreme cases, this noise can result in a complete loss of information, which is referred to as a "radio hole". Such "radio holes" arise regularly in practice, with the frequency being dependent on the speed and the environment of the mobile terminal.

To get around this problem, it is known to receive the information from a radio channel via a plurality of reception paths, the reception paths each having a separate antenna. As a result, a plurality of versions of a signal are received that are used to improve the quality of the received information. In such a case, an antenna is referred to as having diversity. This technique is also known by the term "diversity".

Diversity increases the probability of both antennas not simultaneously being in a "radio hole" and at least one reception path being able to be received.

One option for improving the reception quality by this additional information thus involves selecting that reception path that has a better quality to receive the information and ignoring the other. A disadvantage of this option is that the costs and the energy consumption significantly increase on account of the increased number of reception paths.

US 2010/0173600 A1 discloses a receiver with diversity and a method for changing over the receiver. Each reception path has a separate antenna and a separate reception decoder, and it is possible to choose between various reception modes: in the case of single-channel reception, a particular channel is selected permanently by a controller. In the mode for diversity reception, the signals from both reception paths are combined.

In an automatic reception mode, the appliance uses selected reception characteristics to decide between the two first-mentioned reception modes. This allows the user himself to determine whether and when he wants a reception quality that is as reliable as possible. The temporary deactivation of one of the two reception paths allows the energy consumption to be reduced.

US 2009/0097599 A1 presents a method for operating a digital video broadcasting handheld (DVB-H) receiver that requires only low energy consumption. The receiver takes predetermined power criteria as a basis for automatically deciding when diversity reception is advantageous or necessary. In this case, the power criteria are coefficients that depict the transmission quality of the information, such as the signal-to-noise ratio, the bit error rate or the packet error rate.

DE 600 28 444 T2 describes a method for receiving transmission signals in which at least two of the following diversity types are used: antenna distribution diversity, antenna polarization diversity, antenna diagram diversity and frequency diversity. The quality of the received signals is taken as a basis for changing over from one to the other diversity type, as a result of which the receiver changes over from the frequency distribution diversity to the antenna distribution diversity, for example. However, this requires increased energy consumption and also significantly higher costs in contrast to a system with only one diversity type.

U.S. Pat. No. 6,678,508 B1 describes a mobile communication appliance that has two separate receivers. If the communication appliance uses a receiver with sufficient quality for reception, the other receiver is put into a sleep mode. If the reception quality of the first receiver is no longer sufficient, the signal is received by means of the second receiver. Should the reception quality of the signals from either of the receivers be insufficient, the signals received by the two receivers simultaneously are used in order to construct a single signal therefrom.

An object of the present invention is to achieve better reception at least for one radio channel in a communication system in C2X communication with low additional costs and low additional energy consumption.

In accordance with an aspect of the present invention, provision is made particularly for the communication system to be changed over between two modes of operation when a changeover criterion is satisfied, with the at least two reception paths receiving signals on a different radio channel in the first mode of operation and receiving signals on the same radio channel in the second mode of operation. According to the invention, a radio channel can, if needed, i.e., when preselected changeover criteria are satisfied, be equipped with diversity. This occurs preferably when the reception of this one radio channel is particularly important. The increased number of reception paths for this important radio channel is at the expense of another radio channel, the reception of which is of lesser importance at this time, however.

If there is no such requirement, however, then the reception appliance can receive different information on two different radio channels through the parallel use of the two reception paths. This solution also meets demands that are made on a communication system within the context of the ITS standard, and allows the reception of signals with diversity, without significantly increasing costs and energy consumption for a communication system based on the ITS standard, since the antenna diversity is achieved when needed by virtue of a reception path that is otherwise used in other ways also being used to increase the reception probability occasionally for a radio channel. Established resources that are existent in an ITS communication system are therefore used effectively.

In one preferred application, the control channel is equipped, according to an aspect of the invention, with antenna diversity as required. The resultant, temporary suspension of the reception on the/a service channel does not produce any significant disadvantages, since no safety-relevant information is transmitted on the service channel and the information can also be received at a later time.

The invention is not limited to the case in which precisely two reception paths are provided in the communication system and are used occasionally for one radio channel and occasionally for two different radio channels, i.e. for antenna diversity. The invention may also involve more than two reception channels being provided, all or some of which are used for the inventive antenna diversity.

A particular advantage is that the proposed method can be used as a reception path or reception paths for what are known as software defined radios (SDR). Such a reception path within the context of a reception appliance ideally comprises merely an antenna, an analog-to-digital converter and a computation unit, for example a programmable integrated chip. Hence, such a reception path has a very high level of flexibility, since function adjustments can be achieved by new software or the prescribing of parameters without the need for adjustments to be made to the hardware for this purpose. The hardware of the reception channel is individually suited to all possible radio channels, with a software defined radio (SDR) being used for a reception path in each case, it being possible for a plurality of software defined radios (SDR) to be combined in a piece of hardware or a chip and said software defined radios possibly being combined in a computation unit.

According to a particularly preferred embodiment, the change between the modes of operation takes place on the basis of a (or a plurality of) previously stipulated changeover criterion (criteria) that may possibly itself (themselves) be a parameter-dependent variable or a variable determined by a functional dependency on a variable.

Independently of this, it is particularly advantageous if a comparison variable for the changeover criterion is formed and/or derived from the received signals. In this case, the changeover of the mode of operation can be adjusted to suit the transmission quality and/or the content of the transmission on an up-to-date basis, without the need for additional control (which is complex and takes up resources and also energy) to be provided.

This means that, in the event of a poor transmission or reception situation, the system is automatically able to improve the quality or reliability of the received information, particularly on the safety-relevant control channel. At the same time, another effect achieved is that, in the event of a good reception situation, the control channel is not equipped with diversity and therefore the communication system can be operated efficiently because parallel communication (sending or receiving) on different channels is possible, for example in order to control less safety-relevant applications quickly.

In a development of the inventive system, provision may be made for the comparison variable for the changeover criterion to be ascertained from the reception quality of the received signals. To this end, by way of example, it is possible for signal analysis to be performed and particularly the reception field strength of the signals on a radio channel to be measured or ascertained. This comparison variable can then be compared with a threshold value that forms the changeover criterion. In this case, the measure ascertained for the reception field strength may be the "Received Signal Strength Indication" (RSSI). This is an indicator of the reception field strength that is stipulated in the IEEE 802.11 standards and is specified as a byte value. If this value drops below or exceeds a prescribed threshold value over a period of several milliseconds, for example, the system changes between the modes of operation, with poor reception quality on the radio channel of interest involving the antenna diversity being activated, and exceeding of a threshold value that signals reliable reception involving a switch back from the antenna diversity in one radio channel to parallel communication in different radio channels. On the basis of the invention, this applies accordingly to all changeover criteria.

Alternatively or in addition, the comparison variable ascertained for the changeover criterion may be the number (quantity) of received signals. The mode of operation is then changed over on the basis of a comparison between the number (quantity) of the received signals and the number (quantity) of the expected signals.

In this case, the number of received messages is ascertained and compared with the number to be expected, for example over a stipulatable period. Using this changeover criterion, it is also possible for a communication system operated using the inventive method to react to periodically occurring reception interference in the messages.

In a specific preferred application, the invention can make use of the fact that, in the course of C2X communication based on the ITS standard, what are known as notification messages are transmitted from the parties involved in the C2X communication to their environment. These notification messages are thus transmitted in the manner of a beacon and can constantly be received by the other subscribers, for example in order to obtain an overview of the communication partners and the basic state thereof in networks with constantly changing subscribers to the C2X communication. This communication can take place via the control channel, for example, with further information additionally being able to be interchanged via a service channel.

Frequently, these notification messages are also called CAM (Cooperative Awareness Message) for short. According to the standard provided, CAM messages are transmitted at regular intervals of time from 100 to 500 ms (2-10 Hz) and are provided, inter alia, with the vehicle type, the position, the speed and the direction of the vehicle participating in the C2X communication. In principle, however, they may involve all information that is of benefit, and thus has safety relevance, to the environment. The invention is therefore not necessarily limited to the reception of CAM messages.

According to an aspect of the invention, disturbed reception of CAM messages (or other regularly transmitted messages) can thus be quickly identified by monitoring the quantity of messages, in particular in relation to a period of time. For the CAM messages transmitted at regular intervals of time from 100 to 500 ms (2-10 Hz), it has been found to be particularly appropriate in practice to use a period of 500 milliseconds. This corresponds to the maximum transmission difference between two successive CAM messages and allows an appropriate transmission rate (quantity per period) to be stipulated as a comparison variable in order to quickly identify a reception disturbance. In a further development of the concept above, provision may additionally or alternatively be made for the content of signals received particularly on a radio channel to be analyzed and, on the basis thereof, the comparison variable for the changeover criterion to be ascertained. In this case, the transmitted information is thus analyzed per se. In this regard, the system can, for example as standard, receive the control channel with antenna diversity and change over to parallel two-channel reception as soon as a message or a service notification that is intended to be received on the service channel is announced. In an alternative embodiment of this variant of the invention, the system can, as standard, receive on both or a plurality of radio channels with a respective associated reception path and change the mode of operation on the basis of the transmitted information, for example in order to receive the control channel via both reception paths.

A further opportunity for bringing about the inventive changeover between the two modes of operation "antenna diversity" and "reception paths operating in parallel in different radio channels" involves ascertaining the comparison variable for the changeover criterion on the basis of the identification of a situation that the vehicle is in or of a state of the vehicle. In this regard, it is possible to ascertain environment information and thereby to spot a difficult reception situation or a hazard situation. On the other hand, vehicle states, such as rapid deceleration, the engagement of driver assistance systems, high speed or the like, can be ascertained. Frequently, such information is already present anyway as messages or vehicle parameters in the communication network between various vehicle applications, which means that access to this information is particularly simple in accordance with the invention. In situations or vehicle states in which only one reception channel is needed anyway, the reception channel is equipped with diversity. This is conceivable if the car has been parked and payment is still required, or a garage service is intended to be performed via this channel.

The environment information can, provided that it is not already existent anyway, be ascertained by ambient sensors (camera, radar, Lidar, GPS) on the vehicle and/or by map information from a locating system, for example. A tricky reception situation can exist on the basis of the topology, inter alia, that is to say in the case of serpentine rural roads, urban canyons or in mountainous regions, which topology can either be taken from maps and/or can be derived by evaluating camera images. In addition, diversity reception is advantageous in hazard situations, which can frequently be identified from the road and/or traffic conditions and occur with increasing frequency at points that are eminent in terms of traffic, such as junctions, traffic lights, exits or in the case of queues. Similarly, the weather conditions can be used to detect a hazardous situation or tricky reception situation. One alternative in this regard is direct use of sensors on the vehicle, such as temperature or rain sensors. Alternatively or in addition, it is also possible to resort to external weather forecasts, which can be retrieved via the service channel, for example.

Besides identification of the vehicle environment, it may also make sense to identify the vehicle status, for example on the basis of functions activated in the vehicle, which functions relate particularly to vehicle safety and therefore have a safety relevance and/or which require continuous reception of particular information. In this case, too, the invention provides for it to be possible to change over between the modes of operation, in which case the identification of particular activated vehicle functions is used as a comparison variable for the changeover criterion. To this end, a list of appropriate functions may be available in the vehicle, for example. A function that is relevant to safety can be identified from its SI level, for example, which is defined in more detail in ISO 26262 and is captured as a comparison variable.

The present invention is not limited to the sole application of the changeover criteria described above in each case. Preferably, as many decision criteria as possible are combined with one another in order to have as good a decision basis as possible.

In a development of the inventive method, a possibility is that in the first mode of operation, in which the at least two reception paths receive signals on a different radio channel, a selected radio channel is assigned to the reception path having the best reception quality. Preferably, the control channel is in this case always allocated the reception path with the best reception quality. This therefore ensures that, by way of example, the CAM messages that are received via the control channel are received with the best possible quality, while in parallel the service channel remains ready to receive. This subform of diversity reception therefore ensures that the control channel has the best possible reception quality while at the same time it is possible for signals to be received on two radio channels in parallel. By way of example, this can be achieved from a technical point of view by virtue of the allocation of the antennas to the reception paths being changed by a software command, for example. This is a simple matter particularly in the case of multipath software defined radios.

In a further embodiment, the sending of signals involves the use of at least two antennas. In this case, it is advantageous if the signals are transmitted at staggered times with respect to one another, since this prevents the signals from influencing one another. In this situation, it is necessary to ensure that the addressee can receive the signals via a plurality of propagation paths and can then reconstruct a single signal therefrom.

A communication system on which the method described above can be carried out is also the subject matter of an aspect of the invention. The communication system formed by a suitable unit, for example a vehicle unit, has at least two reception paths that each have at least one separate antenna and a separate receiver for receiving signals in a radio channel, and also has a computation unit that is set up to carry out the method described above or portions thereof.

In a preferred embodiment, the antennas have a different reception characteristic in the at least two different reception paths. This further improves the reception quality in comparison with normal diversity. This embodiment is particularly advantageous for topological, regions in which different antennas have qualitatively better reception. In this regard, one of the antennas may be particularly sensitive in inner-city areas, while the other antenna is particularly sensitive in open areas, in mountainous or wooded regions.

BRIEF DESCRIPTION OF THE DRAWINGS

Further advantages, features and opportunities for application of the present invention become apparent from the description below of an exemplary embodiment and the drawings. In this case, all described and/or graphically illustrated features separately or in any combination form the subject matter of the present invention, even regardless of their summary in the claims or their back-references.

In the drawings:

FIGS. 1A, 1B schematically show traffic situations in which the inventive method for operating a communication system can be used.

DETAILED DESCRIPTION OF THE PRESENTLY PREFERRED EMBODIMENTS

Figure 2:
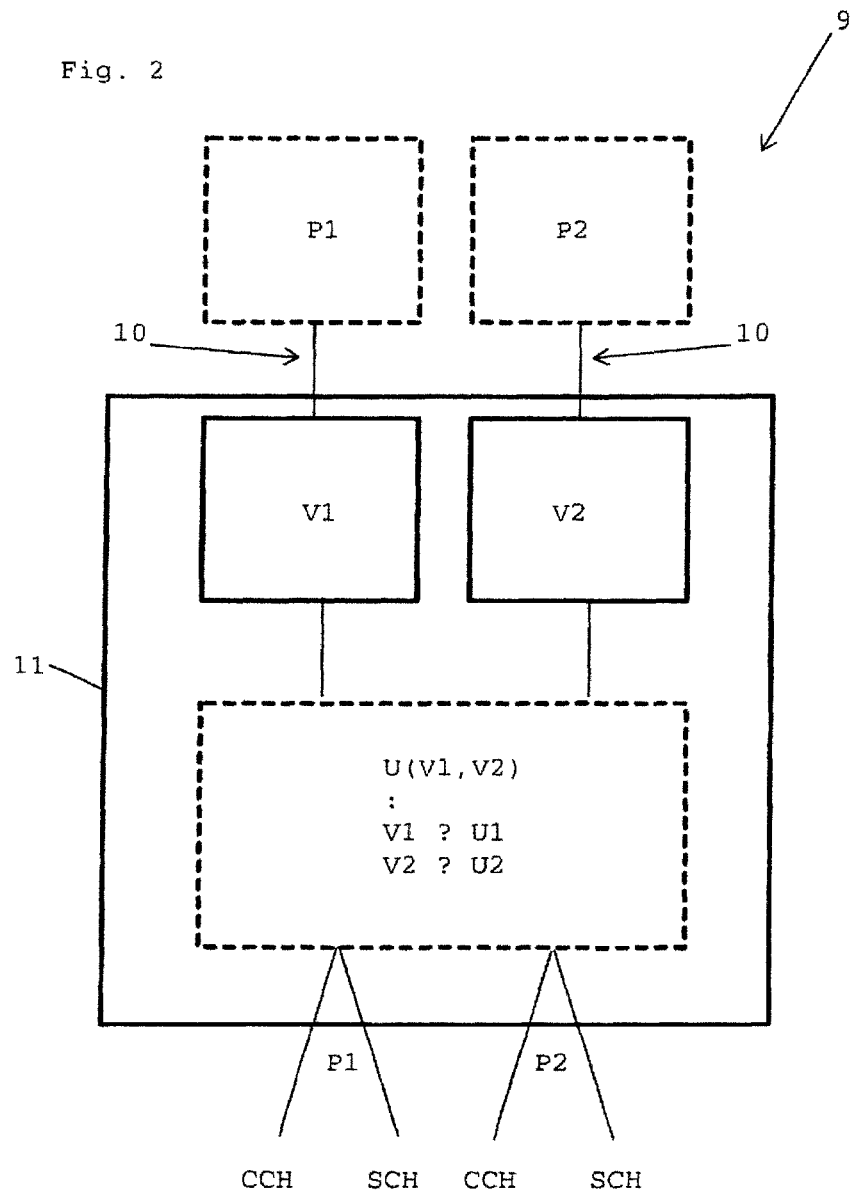
FIG. 2 shows a schematic flowchart for the inventive method for operating a communication system.

FIGS. 1A and 1B show two different traffic situations in which in each case two vehicles 1, 2, which are equipped with an inventive communication system—not shown—for participation in C2X communication, encounter one another on different roads 3, 4 that meet at a junction 5.

The vehicle 2 additionally has a radar sensor as an ambient sensor. In the situation shown in FIG. 1A, the vehicle 2 receives information from its environment both by the radar sensor and by the CAM messages transmitted by the vehicle 1 as part of the C2X communication. The CAM messages from the vehicle 1 contain the position, speed and direction of the vehicle 1 and are indicated at the coordinates of a defined coordinate system of a global locating system that both vehicles 1, 2 jointly use. Hence, the vehicle 2 can incorporate this information into its assistance system and establish that those areas 6 and 7 of the two vehicles 1, 2 that are classified as relevant to safety are overlapping. In a potential hazard situation of this kind, it is important for the further CAM messages from the vehicle 1 also actually to be received in the C2X communication in order to establish whether the vehicle 1 yields as required and slows down or stops or whether the vehicle 1 continues to travel at constant speed. In the latter case, the assistance system of the vehicle could intervene in order to avoid a collision.

The classification of an identified traffic situation as a potential hazard situation that requires reliable reception of further CAM messages therefore forms an inventive comparison variable that is compared with the changeover criterion and in this case also satisfies the changeover criterion. Following a check on the changeover criterion using the comparison variable, the vehicle 2 changes over to reception with antenna diversity for the control channel on which the CAM messages are transmitted and received. As a result, the control channel is received via two reception paths that are independent of one another in terms of their function, and the probability of safe reception of the CAM messages or of other important information on the control channel is significantly increased. The service channel that is otherwise received via the reception path that is now connected to the control channel cannot be received—at least via this reception path—during the antenna diversity.

In the situation shown in FIG. 1B, the assistance system—formed in particular by a computation unit—of the vehicle 2 identifies from the ambient sensor system of its radar sensor and the CAM messages from the vehicle 1 that the crossing vehicle 1 is not in the areas 6, 7 that are classified as relevant to safety. Therefore, the changeover criterion is not satisfied and reception with antenna diversity (diversity reception) is not activated. The reception paths each receive information via different radio channels.

A different assessment of the same traffic situation shown in FIG. 1B can result when there is a stationary transmitter 8, known as a roadside unit (RSU), at the junction 5. This stationary transmitter also transmits CAM messages and additionally what are known as MAP messages (messages that describe the topology in the environment) and thereby notifies the arriving vehicles 1, 2 that they are approaching a junction 5 that is classified as particularly critical, and/or in the proximity of which, for example as a result of architectural shielding, the reception of signals from other vehicles 1, 2 in C2X communication is susceptible to error. This information is captured in a comparison variable (identifier for a safety-relevant or dangerous section of road) and compared with the changeover criterion. In this case, the comparison results in the vehicles 1, 2 automatically changing over to reception with antenna diversity for the control channel when they receive the CAM messages from the roadside unit 8.

The situations described above are merely examples in which the comparison of a comparison variable derived from received signals and/or driving states or vehicle environment situations with a changeover criterion results or does not result in a change between the two modes of operation. Particularly the changeover criteria described at the outset or simultaneously arising for a person skilled in the art can—according to the invention—be applied in corresponding situations.

FIG. 2 schematically shows a method sequence for the operation of an inventive communication system 9.

FIG. 2 shows two reception paths P1 and P2 that each have a separately operational antenna with an associated receiver for decoding the received signals. By way of example, the receiver can also perform analog-to-digital conversion for the signals and can supply the signals as digital data to a computation unit 11 of the communication system 9 via an interface 10.

The computation unit 11 is configured to derive one or more comparison variables V1, V2 from the received signals and/or other information from the identification of a situation that the vehicle is in, or of a state of the vehicle. In this case, V1 represents one or more comparison variables in the first reception path P1 and V2 represents one or more comparison variables in the second reception path P2.

These comparison variables V1, V2 are subsequently subjected in the computation unit to a comparison U(V1, V2) with changeover criteria U1 and U2 that may each match the comparison variable V1, V2 just formed. It may also be possible for just a portion of the comparison variables V1 or V2, for example the comparison variables formed from signals from a particular reception path P1 or P2, to be subjected to the comparison U(V1, V2).

As a result of the comparison U(V1, V2), the computation unit then decides which reception path P1, P2 is assigned to which of the possible radio channels (CCH, SCH), with CCH corresponding to the control channel for the C2X communication and SCH corresponding to the service channel for the C2X communication.

In the case of reception with antenna diversity for the control channel CCH, the computation unit 11 thus assigns the control channel CCH both to the reception path P1 and to the reception path P2. Otherwise, it assigns one radio channel CCH, SCH to one reception path P1, P2 and the other radio channel SCH, CCH to the other reception path P2, P1, so that each reception path P1, P2 can simultaneously communicate on a different radio channel CCH, SCH.

Even when the two reception paths P1, P2 are operated on different radio channels CCH, SCH, i.e., operation without antenna diversity, provision may be made for the computation unit to assign the reception path P1, P2 with the best reception quality Q to the safety-relevant control channel CCH. To this end, the comparison variables V1 and V2 formed are respectively the reception qualities Q1 and Q2 of the two reception paths P1 and P2. During the comparison U(Q1, Q2), the maximum of the reception qualities Q1 and Q2 is then formed.

The control channel CCH is then allocated to the reception path P1 or P2 with the maximum reception quality Q1 or Q2. The service channel SCH is then allocated to the other reception path P2 or P1. In this way, the reception quality on the control channel CCH is also optimized regardless of an antenna diversity.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a communication system (9) in wireless vehicle-to-environment communication, comprising:
    transmitting, using the communication system (9), different information as signals on various radio channels (CCH, SCH) in accordance with its content, the communication system (9) having at least two reception paths (P1, P2) each having at least one separate antenna and an associated separate receiver for receiving the transmitted signals in a radio channel (CCH, SCH) from among the various radio channels (CCH, SCH); and
    changing over the communication system (9) between two modes of operation when a changeover criterion (U1, U2) is satisfied, such that the at least two reception paths (P1, P2) receive signals on a different radio channel (CCH, SCH) in a first mode of operation and receive signals on the same radio channel (CCH or SCH) in a second mode of operation.

2. The method as claimed in claim 1, further comprising forming and/or deriving a comparison variable (V1, V2) for the changeover criterion (U1, U2) from received signals.

3. The method as claimed in claim 2, further comprising ascertaining the comparison variable (V1, V2) for the changeover criterion (U1, U2) from the reception quality, including the reception field strength of the signals on a radio channel (CCH, SCH).

4. The method as claimed in claim 3, wherein the comparison variable (V1, V2) ascertained for the changeover criterion (U1, U2) is the quantity of received signals.

5. The method as claimed in claim 2, further comprising:
    evaluating content of signals; and
    ascertaining the comparison variable (V1, V2) for the changeover criterion (U1, U2) from the evaluated content of signals.

6. The method as claimed in claim 2, further comprising ascertaining the comparison variable (V1, V2) for the changeover criterion (U1, U2) on the basis of an identification of a situation of a vehicle (1, 2) or of a state of the vehicle (1, 2).

7. The method as claimed in claim 6, wherein an ambient sensor system and/or map material is/are used for identifying the situation of the vehicle (1, 2) or the state of the vehicle (1, 2).

8. The method as claimed in claim 6, wherein an identification of an activated vehicle function is used as a comparison variable (V1, V2) for the changeover criterion.

9. The method as claimed in claim 1, wherein sending of signals uses at least two antennas.

10. A method for operating a communication system (9) in wireless vehicle-to-environment communication, comprising:
    transmitting, using the communication system (9), different information as signals on various radio channels (CCH, SCH) in accordance with its content, the communication system (9) having at least two reception paths (P1, P2) each having at least one separate antenna and an associated separate receiver for receiving the transmitted signals; and
    changing over the communication system (9) between two modes of operation when a changeover criterion (U1, U2) is satisfied, such that the at least two reception paths (P1, P2) receive signals on a different radio channel (CCH, SCH) in a first mode of operation and receive signals on the same radio channel (CCH or SCH) in a second mode of operation,
    wherein in the first mode of operation, in which the at least two reception paths (P1, P2) receive signals on a different radio channel (CCH, SCH), a selected radio channel (CCH or SCH) is assigned to the reception path (P1, P2) having the best reception quality.

11. A communication system in wireless vehicle-to-environment communication, comprising:
a computation unit (11); and
at least two reception paths (P1, P2) each having at least one separate antenna and a separate receiver configured to receive signals in a radio channel (CCH, SCH),
wherein the computation unit (11) is configured to carry out the method comprising:
transmitting, using the communication system, different information as signals on various radio channels (CCH, SCH) in accordance with its content, the at least two reception paths (P1, P2) each having the at least one separate antenna and an associated separate receiver for receiving the transmitted signals; and
changing over the communication system between two modes of operation when a changeover criterion (U1, U2) is satisfied, such that the at least two reception paths (P1, P2) receive signals on a different radio channel (CCH, SCH) in a first mode of operation and receive signals on the same radio channel (CCH or SCH) in a second mode of operation.

12. The communication system as claimed in claim 11, wherein the antennas have a different reception characteristic in the at least two different reception paths (P1, P2).

* * * * *